Aug. 18, 1942.  W. D. SPILLMAN  2,293,411
THICKNESS GAUGE
Filed Oct. 14, 1940

INVENTOR
William D. Spillman
BY
ATTORNEY

Patented Aug. 18, 1942

2,293,411

UNITED STATES PATENT OFFICE 2,293,411

THICKNESS GAUGE

William D. Spillman, Ponca City, Okla., assignor to Continental Oil Company, Ponca City, Okla., a corporation of Delaware Application October 14, 1940, Serial No. 361,015

2 Claims. (Cl. 33—143)

My invention relates to a thickness gauge for calipering wall thicknesses and the like.

Certain types of tubular equipment must have their thickness calipered from time to time for reasons of safety where such equipment contains liquids and fluids under high pressure. The customary mode of calipering wall thicknesses is to drill a hole and then caliper the wall in the region of the hole. After calipering, the hole is welded or tapped and plugged.

Gauges available for this work require the drilling of a fairly large hole. Large holes tend to weaken the pipe or vessel wall. This is especially true after numerous test holes have been drilled into the pipe or vessel.

One object of my invention is to provide a thickness gauge which will enable the calipering of wall thicknesses through a very small opening.

Another object of my invention is to provide a thickness gauge, provided with a lock nut, enabling the gauge to be withdrawn from the hole so that the wall thickness may be read at a more convenient angle and location.

Another object of my invention is to provide a light, small and compact thickness gauge.

Another object of my invention is to provide a gauge which will measure thicknesses through a wide range.

Other and further objects of my invention will appear from the following description.

In the accompanying drawing which forms part of the instant specification and is to be read in conjunction therewith and in which like reference numerals are used to indicate like parts in the various views.

Figure 1:
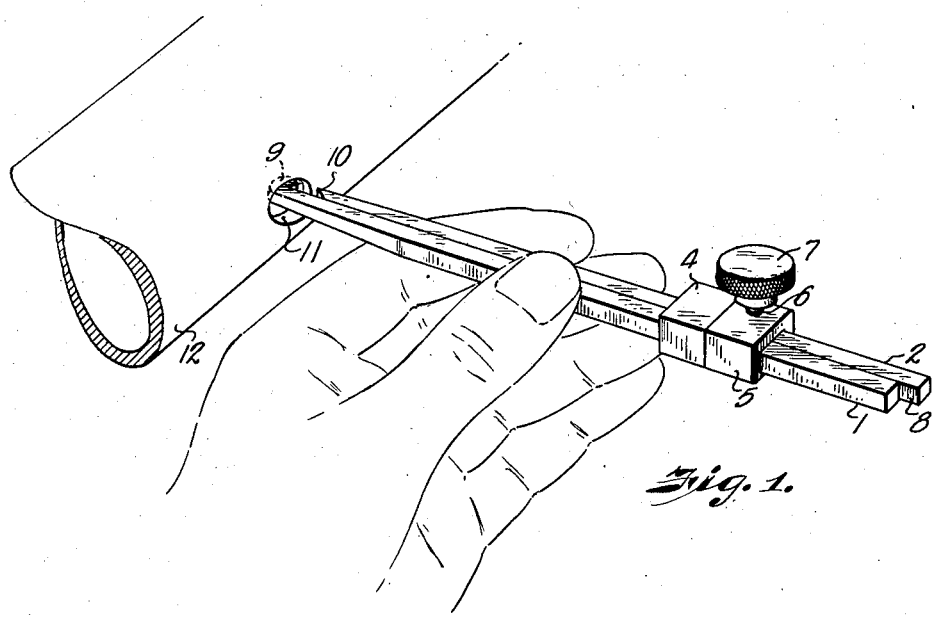
Figure 1 is a perspective view, showing my thickness gauge in use.
Figure 2:
Figure 2 is a plan view of the thickness gauge shown in Figure 1.
Figure 3:
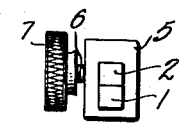
Figure 3 is an end view of my thickness gauge.
Figure 4:
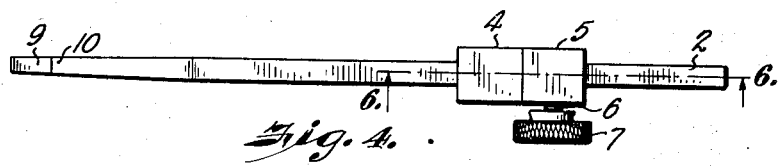
Figure 4 is a side elevation of my thickness gauge.
Figure 5:
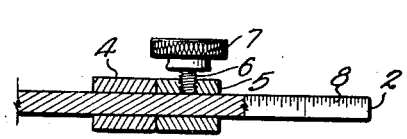
Figure 5 is a sectional view taken on the line 5—5 of Figure 2.
Figure 6:
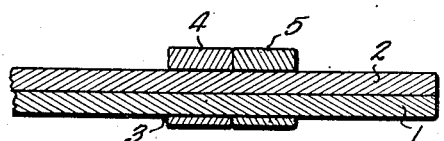
Figure 6 is a sectional view taken on the line 6—6 of Figure 4.

Referring now to the drawing, the gauge comprises a pair of members 1 and 2. Secured to member 1 by welding or the like at 3 is a collar 4. A slidable collar 5 is provided with a set screw 6 operated by a knurled handle 7. The set screw is adapted to lock the collar 5 to member 2. The surface of member 2, which abuts member 1, is provided with calibrations 8. Member 1 is provided with a hardened hook point 9. This point is effective in removing burrs, paint, dirt, and coke from around the hole in determining the true thickness of the metal. The gauge shown in the drawing will measure up to three inches in thickness. Similar gauges could be made simply and expeditiously to measure up to four or five inches. This is a marked advantage over the gauges of the prior art which usually are limited to measure up to one or two inches.

In operation, the set screw 6 is loosened by operation of the handle 7. The points 9 and 10 are separated by sliding member 2 which carries point 10 away from point 9. A hole 11 having been drilled in the pipe 12, it being desired to measure the wall thickness of pipe 12, the hooked point 9 of member 1 is inserted through the hole and grounded against the inside of the pipe. Member 2 is then slid toward the pipe so that point 10 may contact the exterior of the pipe. When good contact is made, the fingers of one hand squeeze the two members 1 and 2 together, holding firm contact between the measuring points. The collar 5 is then slid against collar 4 to make firm contact and the set screw 6 is then tightened to lock collar 5 to the member 2. After this is done, member 2 and the collar 5 may be slid rearwardly spreading the points 9 and 10. The measuring instrument may then be removed from the hole and taken to a convenient location. The two collars 4 and 5 are allowed to contact each other again and the wall thickness is read on a calibrated scale 8.

It will be seen that I have accomplished the objects of my invention. I have provided a wall thickness gauge which may be used with a very small hole. The gauge may be withdrawn from the hole and the thickness read at a convenient location. This is of value in inaccessible locations as in the inside of fractionating towers and the like. The gauge is very small, light, and compact. It requires no rule or other measuring device to accurately read the wall thickness. The gauge may be kept in an accurate state in event the hardened points become worn by simply filing the ungraduated rod slightly and checking with a machinist's micrometer. The gauge can be made to measure to four to five inches by simply lengthening the rods.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A wall thickness gauge comprising in combination a pair of relatively slidable elongated members, one of said members being formed at one end thereof with a laterally extending hook portion which projects across the adjacent end of the other member and terminates substantially flush with the outer side thereof, the hook portion having a hardened point that extends toward the adjacent end of the other member and cooperates therewith in obtaining measurements, and at least one collar around said members holding them together.

2. A wall thickness gauge comprising in combination a pair of relatively slidable elongated members, one of said members being formed at one end thereof with a laterally extending hook portion which projects across the adjacent end of the other member and terminates substantially flush with the outer side thereof, the hook portion having a hardened point that extends toward the adjacent end of the other member and cooperates therewith in obtaining measurements, a pair of collars around said members holding them together, means for securing one of the collars to one of said members, and means for adjustably securing the other of said collars to the other of said members.

WILLIAM D. SPILLMAN.